(12) United States Patent
Labrot et al.

(10) Patent No.: US 8,722,195 B2
(45) Date of Patent: *May 13, 2014

(54) COMPOSITE GLASS PANE AS HEAD-UP DISPLAY

(75) Inventors: Michael Labrot, Aachen (DE); Luz Rodriguez Gonazález, Neuss (DE); Marie-Hélène Breniaux, Mulhouse (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/499,235

(22) PCT Filed: Oct. 4, 2010

(86) PCT No.: PCT/EP2010/064734
§ 371 (c)(1),
(2), (4) Date: Aug. 3, 2012

(87) PCT Pub. No.: WO2011/042384
PCT Pub. Date: Apr. 14, 2011

(65) Prior Publication Data
US 2012/0299328 A1 Nov. 29, 2012

(30) Foreign Application Priority Data
Oct. 5, 2009 (DE) .................. 10 2009 044 181

(51) Int. Cl.
*B32B 17/10* (2006.01)
*B32B 27/20* (2006.01)
*B32B 37/18* (2006.01)
*B60J 1/00* (2006.01)

(52) U.S. Cl.
USPC ............ 428/437; 156/67; 156/106; 296/84.1; 428/339; 428/340

(58) Field of Classification Search
USPC ............ 428/339, 340, 437; 296/84.1; 156/67, 156/106
See application file for complete search history.

(56) References Cited

U.S. PATENT DOCUMENTS

| 7,090,355 | B2 | 8/2006 | Liu et al. |
| 7,230,767 | B2 | 6/2007 | Walck et al. |
| 8,487,277 | B2 * | 7/2013 | Labrot et al. ............... 250/461.1 |
| 2003/0193044 | A1 | 10/2003 | Henry et al. |
| 2006/0171007 | A1 | 8/2006 | Chen et al. |
| 2011/0076473 | A1 * | 3/2011 | Lin et al. ...................... 428/213 |

FOREIGN PATENT DOCUMENTS

| DE | 40 24 330 A1 | 2/1992 |
| DE | 10350529 | 3/2005 |
| DE | 102005061855 | 7/2007 |
| DE | 603 14 613 T2 | 3/2008 |
| EP | 2110237 | 10/2009 |
| FR | 2 929 017 A1 | 9/2009 |

(Continued)

OTHER PUBLICATIONS

PCT Search Report of International Application PCT/EP2010/064734 filed Oct. 4, 2010 in the name of Saint Gobain Glass France, Mail Date: Jan. 19, 2011.

(Continued)

*Primary Examiner* — D. S. Nakarani
(74) *Attorney, Agent, or Firm* — Steinfl & Bruno LLP

(57) ABSTRACT

A composite glass pane comprising at least an upper pane, a lower pane, and an intermediate layer between the upper pane and the lower pane is described.

19 Claims, 3 Drawing Sheets

(56) References Cited

FOREIGN PATENT DOCUMENTS

WO 2004/099172 A1 11/2004
WO 2008/132368 A2 11/2008

OTHER PUBLICATIONS

PCT Written Opinion of International Application PCT/EP2010/064734 filed Oct. 4, 2010 in the name of Saint Gobain Glass France.

Day, M., et al., Photochemical Degradation of Poly (ethylene Terephthalate). I. Irradiation Experiments with the Xenon and Carbon Arc, J. Applied Polymer Science 1972, 16: 175-189.

PCT Written Opinion mailed Apr. 5, 2012 for PCT Application PCT/EP2010/064734 filed on Oct. 4, 2010 in the name of Saint-Gobain Glass France (English + German).

* cited by examiner

COMPOSITE GLASS PANE AS HEAD-UP DISPLAY

CROSS REFERENCE TO RELATED APPLICATIONS

The present application is the US national stage of International Application PCT/EP2010/064734 filed on Oct. 4, 2010, which, in turn, claims priority to German Patent Application 10 2009 044 181.6 filed on Oct. 5, 2009.

The invention relates to a composite glass pane, a method for the production of the composite glass pane, and its use as a head-up display.

Head-up displays are widespread in aviation. The systems mounted in the direct field of vision of pilots display the most important data about their own and other aircraft. These systems, established and much used in the military sector, also have many possibilities for use in the civil sector, in particular in the automobile sector. Thus, data about the speed, the distance from the preceding vehicle or directional data from the navigation equipment can be displayed right at the eye level of the driver. These possibilities clearly improve the traffic safety of the vehicle as the driver cannot watch the traffic situation while looking at the instruments. With increased speeds of the motor vehicle, on freeways, for example, the distance traveled "blind" by the vehicle can be significant and can cause an increased accident risk.

If head-up displays (HUD) are illuminated by an external light source, such as a laser, the light fields can be seen only with difficulty depending on the prevailing light and weather conditions. Strong sunlight and light reflection through drops of water make seeing the data projected in the head-up display significantly more difficult.

DE 603 14 613 T2 discloses a photochromic composition and a method for its production. The composition contains a linear, cross-linkable polyurethane or polyurethane-urea polymer and a photochromic organic compound.

WO 2004/099172 A1 discloses a photochromic composition on a benzo-, naphtho-, and phenathrochromic structure substituted with an arylamine group.

U.S. Pat. No. 7,230,767 B2 discloses an image display system in a motor vehicle window pane. The arrangement contains luminescent compounds outward facing side of the inner pane. The luminescent compounds are illuminated by a light source and appear in the field of vision of an automobile driver.

The object of the invention is to provide a composite glass pane that can be used as a head-up display and enables good recognizability even with bright viewing conditions as well as high luminosity of the projected pictograms, numbers, and graphic characters.

The object of the present invention is accomplished according to the invention by a composite glass pane, a device, a method for its production, and its use according to independent claims 1, 11, 13, and 15. Preferred embodiments emerge from the subclaims.

The composite glass pane according to the invention comprises at least an upper pane, a lower pane, and at least a polymer layer. The panes preferably comprise flat glass (float glass), quartz glass, borosilicate glass, soda lime glass. The panes preferably have average light transmission (unless otherwise specified as light transmission for light type A and a 2°-standard observer according to DIN 5033 for light of the wavelengths from 380 nm to 780 nm) of more than 80%, preferably more than 90%. The panes preferably have light transmission of >70%, particularly preferably 75% in the wavelength range from 360 nm to 420 nm.

The intermediate layer contains at least one luminescent pigment and preferably a PVB (polyvinyl butyral) film. The luminescent pigments are preferably contained in the entire volume of film. Luminescent pigments contain, in the context of the invention, organic and/or inorganic chromophoric or luminescent compounds, ions, aggregates, and/or molecules. Luminescence includes fluorescence and/or phosphorescence processes, i.e., excitation with electromagnetic radiation and the emission of electromagnetic radiation. The radiation emitted preferably has a different wavelength from the exciting radiation. The radiation emitted preferably has a higher wavelength.

The PVB film preferably has light transmission of >70%, particularly preferably >82% measured at a wavelength of 405 nm. The light transmission of the PVB film can be preset by film thickness, polymer composition, degree of polymerization, polymerization distribution, UV blockers, or plasticizers. The PVB film according to the invention permits only a slight weakening of the exciting and emitted electromagnetic radiation and, thus, high luminosity of the head-up display.

The PVB film preferably has light transmission of >50%, preferably >60%, particularly preferably >70% measured at a wavelength of 375 nm.

The PVB film preferably has light transmission of >75%, preferably >82% in the wavelength range from 390 nm to 410 nm.

The intermediate layer preferably contains PET (polyethylene terephthalate), PVC (polyvinyl chloride), PU (polyurethane), EVA (polyethyl vinyl acetate), and mixtures as well as copolymers thereof.

The intermediate layer preferably contains no UV blockers active in the range of the excitation spectrum of the fluorescent particles between 360 nm and 400 nm. The luminescent pigments according to the invention preferably act as UV blockers.

The luminescent pigment preferably has a local excitation maximum in the range from 350 nm to 450 nm, particularly preferably 390 nm to 420 nm. Good results are obtained in this range.

The luminescent pigment preferably has a local emission maximum in the range from 400 nm to 800 nm, particularly preferably 430 nm to 500 nm. Good results are obtained in this range.

The intermediate layer preferably has a thickness of 0.30 mm to 0.9 mm, preferably 0.50 mm to 0.80 mm. Good results are obtained in this layer thickness range.

The luminescent pigment preferably contains a hydroxyalkyl terephthalate having the formula: R1-COO—P(OH)x (0-4)-COO—R2, where R1, R2 is an alkyl or allyl residue having 1 to 10 C atoms, P is a phenyl ring, OH is hydroxyl groups bonded to the phenyl ring, and x is the number of hydroxyl groups bonded to the phenyl ring. The general structural formula is:

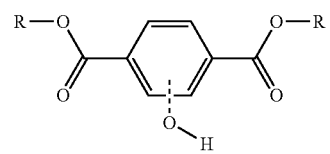

The luminescent pigment preferably contains diethyl 2,5-dihydroxyterephtalate. The structural formula is:

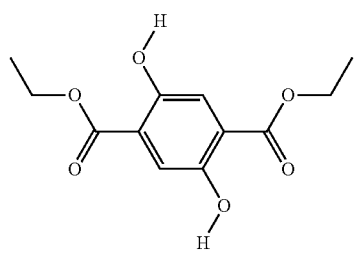 [SMILES: CCOC(=O)c1cc(O)c(C(=O)OCC)cc1O]

The luminescent pigment preferably contains benzopyranes, naphthopyranes, 2H-naphthopyranes, 3H-naphthopyranes, 2H-phenanthropyranes, 3H-phenanthropyranes, photochromic resins, coumarins, xanthines, naphthalic acid derivatives, oxazoles, stilbenes, styryls, perylenes, lanthanides, preferably $Y_2O_3$:Eu, $YVO_4$:Tm, $Y_2O_2S$:Pr, $Gd_2O_2S$:Tb, and/or mixtures thereof.

The luminescent pigment preferably additionally contains, as a solvent, alcohols, ketones, esters, amines, amides, and/or mixtures thereof. The luminescent pigment particularly preferably additionally contains ethanol, tetrahydrofuran, and/or benzyl alcohol.

The intermediate layer preferably contains 0.1 g/m² to 15 g/m² of luminescent pigment. The quantity indications are based on a thickness of the intermediate layer of roughly 0.76 mm. Good results are obtained in this range.

The upper pane and/or lower pane preferably have a thickness of 1 mm to 4 mm, particularly preferably 1.4 mm to 2.5 mm. The upper pane and the lower pane can have different thicknesses.

The upper pane and/or lower pane preferably have tinting and/or coating. The tinting and/or coating can amplify the contrast of the projected image and protect the luminescent pigments from aging. The upper, outward facing pane preferably contains tinting and/or coating and the lower pane, facing inward toward the light source, contains no tinting and/or coating.

The invention further comprises a device for the display of a pictogram, numbers, and graphic characters. The device comprises a composite glass pane as described above and a light source aimed at the composite glass pane. The light source emits electromagnetic radiation of the wavelength of 360 nm to 420 nm. The radiation emitted by the light source is absorbed by the luminescent pigments in the intermediate layer and is re-emitted with a changed wavelength. This emitted radiation is perceived by the viewer as a pixel on the pane. The light source preferably comprises a diode laser.

The invention further comprises a method for the production of a composite glass pane. The method comprises, in a first step, the application of a luminescent pigment on a PVB film, which, in the following step, is laminated between an upper pane and a lower pane. The lamination preferably occurs at temperatures from 120° C. to 170° C., a pressure of 10 bar to 15 bar, and for a period of 30 min to 240 min. During lamination, the luminescent pigments are preferably distributed uniformly in the entire PVB film.

The luminescent pigment is preferably applied by spraying, screen printing, offset printing, ink jet printing, and/or flexographic printing.

The invention further comprises the use of the composite glass pane as transparent or semi-transparent display systems, head-up display in buildings, motor vehicles, airplanes, and/or helicopters, particularly preferably as windshields in motor vehicles.

In the following, the invention is explained in detail with reference to the drawings and an exemplary embodiment as well as a comparative example. The drawings are purely schematic representations and are not to scale. They in no way restrict the invention.

They depict:

FIG. 1 a cross-section of the composite glass pane according to the invention, FIG. 2 a cross-section of the intermediate layer, and FIG. 3 a cross-section of the device according to the invention.

Figure 1:
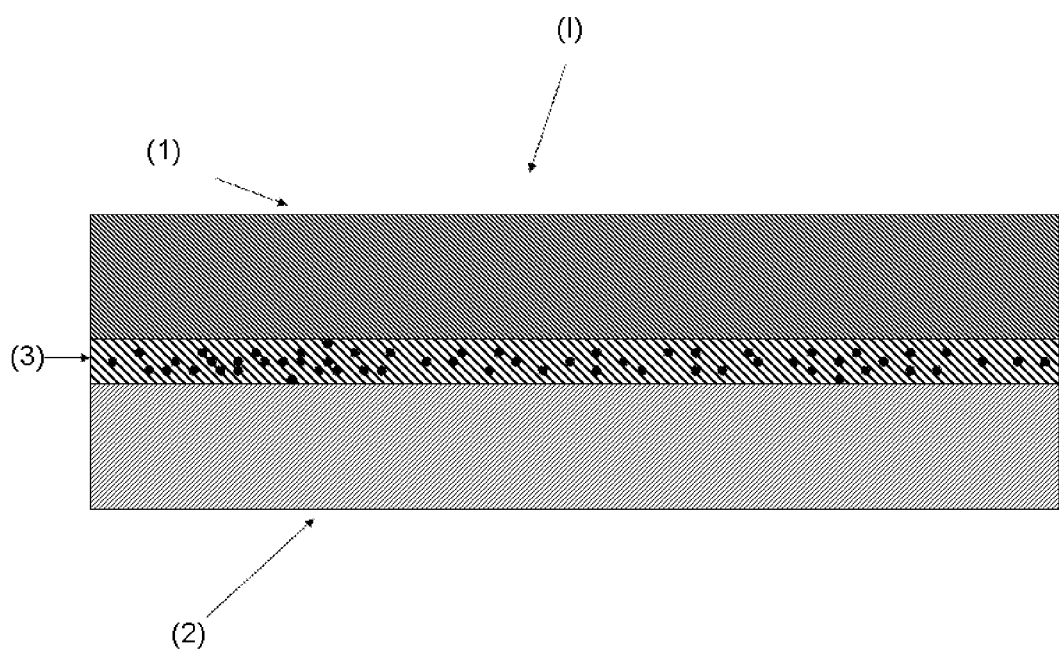
FIG. 1 depicts a cross-section of the composite glass pane (I) according to the invention comprising an upper pane (1), an intermediate layer (3), and a lower pane (2).
Figure 2:
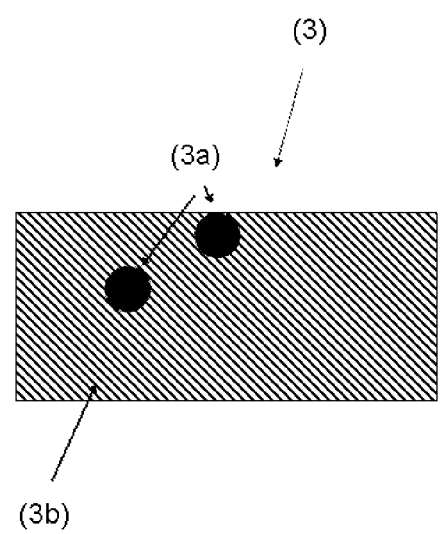
FIG. 2 depicts an enlarged representation of the intermediate layer (3) made of PVB film (3b) and luminescent pigments (3a) in greatly enlarged representation. The luminescent pigments (3a) are preferably statistically distributed in the entire volume of the film (3).
Figure 3:
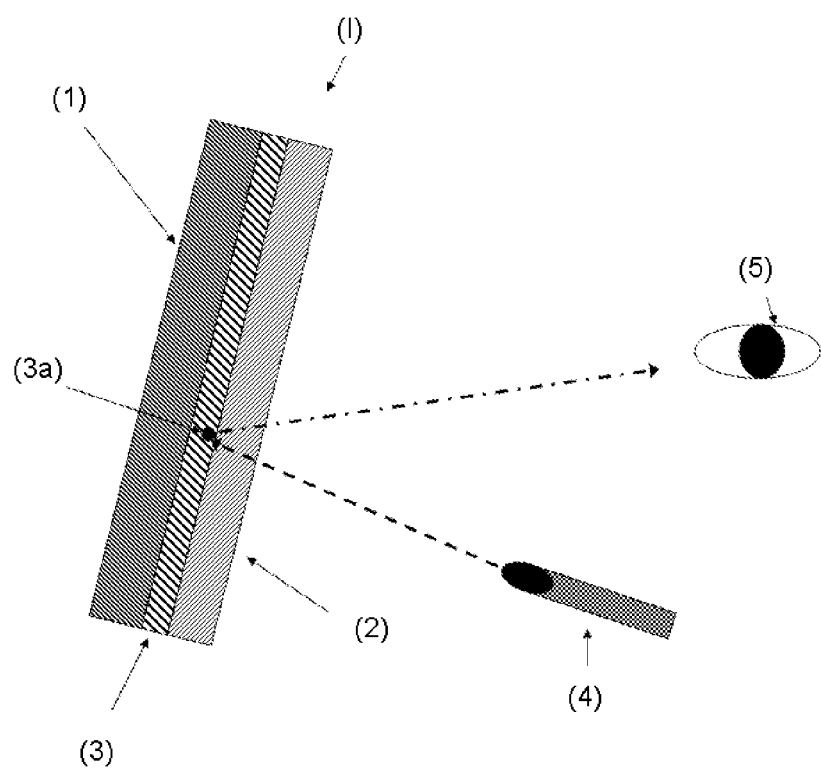

FIG. 3 depicts a cross-section of the device according to the invention. The composite glass pane (I) comprising an upper pane (1), an intermediate layer (3), and a lower pane (2) is illuminated by a light source (4), preferably a diode laser. The luminescent pigments (3a) located in the intermediate layer emit light that is perceived by the viewer as a signal or pictogram.

In the following, the invention is explained in detail with reference to an example and a comparative example.

In two series of experiments, two different PVB films (3b) were printed with a luminescent pigment (3a), by a screen printing method, for example, and then the luminosity was determined as emission in a fluorescence spectrometer.

EXAMPLE 1

According to the Invention

A PVB film AG21 (3b) (Solutia, Gent, Belgium) with a thickness of 0.51 mm is printed on with diethyl-2,5-dihydroxyterephtalate (3a) in ethanol. The concentration of diethyl-2,5-dihydroxyterephtalate in the PVB film is 3 g/m². The light transmission of the unprinted PVB film without luminescent pigment is 86.4% at 405 nm, measured on a composite glass made of 2×2.1 mm clear glass.

EXAMPLE 2

Comparative Example

A PVB film RF41 (3b) (Solutia, Gent, Belgium) with a thickness of 0.76 mm is printed on with diethyl-2,5-dihydroxyterephtalate (3a) in ethanol. The concentration of diethyl-2,5-dihydroxyterephtalate in the PVB film is 3 g/m². The light transmission of the unprinted PVB film without luminescent pigment is 54.6% at 405 nm, measured on a composite glass made of 2×2.1 mm clear glass.

The printed PVB films were exposed to an excitation wavelength of 405 nm in a fluorescence spectrometer (Perkin Elmer). The intensity of the emitted radiation in the emission maximum was measured at 448 nm. The results are summarized in Table 1. In a second experiment, luminance was determined using a LumiCAM 4.0/1300 Color (Instrument Systems, 81673 Munich, Germany).

| Example | Emission [A.U.] | Luminance [cd/m$^2$] |
| --- | --- | --- |
| 1 (according to the invention) | 690 | 436 |
| 2 (comparative example) | 780 | 527 |

The emission of Example 1 according to the invention is 11.5% higher than in the Comparative Example 2. The luminance of the example according to the invention is 20% higher than in the comparative example. These results were surprising and unexpected.

LIST OF REFERENCE CHARACTERS (1) upper pane,
(2) lower pane,
(3) intermediate layer,
(3a) luminescent pigment,
(3b) PVB film,
(4) light source,
(5) viewer, and
(I) composite glass pane according to the invention.

The invention claimed is:

1. A composite glass pane comprising:
   an upper pane;
   a lower pane; and
   an intermediate layer between the upper pane and the lower pane,
   wherein the intermediate layer comprises at least one luminescent pigment and one polyvinyl butyral (PVB) film,
   wherein the PVB film has a light transmission of greater than 70% when measured at a wavelength of 405 nm,
   wherein the luminescent pigment comprises an alkyl hydroxyterephthalate having a formula: $R_1$—COO—P(OH)x(1-4)-COO—$R_2$, wherein $R_1$, $R_2$ is an alkyl or allyl residue having 1 to 10 C atoms, P is a phenyl ring, OH is a hydroxyl group bonded to the phenyl ring, and x is a number of hydroxyl groups bonded to the phenyl ring.

2. The composite glass pane according to claim 1, wherein the PVB film has a light transmission of greater than 50% when measured at a wavelength of 375 nm.

3. The composite glass pane according to claim 1, wherein the intermediate layer is devoid of UV blockers.

4. The composite glass pane according to claim 1, wherein the at least one luminescent pigment has an excitation maximum ranging from 350 nm to 450 nm.

5. The composite glass pane according to claim 1, wherein the at least one luminescent pigment has an emission maximum ranging from 400 nm to 800 nm.

6. The composite glass pane according to claim 1, wherein the intermediate layer has a thickness of 0.30 mm to 0.9 mm.

7. The composite glass pane according to claim 1, wherein the intermediate layer comprises 0.1 g/m$^2$ to 15 g/m$^2$ of the at least one luminescent pigment, said intermediate layer having a thickness of 0.76 mm.

8. The composite glass pane according to claim 1, wherein the upper pane and/or lower pane comprise tinting and/or coating.

9. The composite glass pane according to claim 1, wherein the PVB film has a light transmission of greater than 60% when measured at a wavelength of 375 nm.

10. The composite glass pane according to claim 1, wherein the at least one luminescent pigment has an excitation maximum ranging from 390 nm to 420 nm.

11. The composite glass pane according to claim 1, wherein the at least one luminescent pigment has an emission maximum ranging from 430 nm to 500 nm.

12. The composite glass pane according to claim 1, wherein the intermediate layer has a thickness of 0.50 mm to 0.8 mm.

13. The composite glass pane according to claim 1, wherein the alkyl hydroxyterephthalate is a diethyl 2,5-dihydroxyterephtalate.

14. A device for displaying a pictogram, graphic characters, and/or numbers comprising the composite glass pane according to claim 1, and a light source aimed at the composite glass pane, wherein the light source is adapted to emit an electromagnetic radiation having a wavelength of 380 nm to 420 nm onto the composite glass pane.

15. The device according to claim 14, wherein the light source comprises a diode laser.

16. A method comprising using the composite glass pane of claim 1 as a head-up display in one or more of: buildings, motor vehicles, airplanes, and/or helicopters, wherein the composite glass pane is illuminated by a light source and the luminescent pigments located in the intermediate layer emit light that is perceived by the viewer as a signal or pictogram.

17. A method comprising: using the composite glass pane of claim 1 as windshields in motor vehicles, wherein the composite glass pane is illuminated by a light source and the luminescent pigments located in the intermediate layer emit light that is perceived by the viewer as a signal or pictogram.

18. A method for producing a composite glass pane, the method comprising:
   applying a luminescent pigment on a polyvinyl butyral (PVB) film;
   placing the PVB film and the applied luminescent pigment between an upper pane and a lower pane; and
   laminating the PVB film and the applied luminescent pigment to obtain an intermediate layer, wherein the luminescent pigment comprises an alkyl hydroxyterephthalate having a formula: $R_1$—COO—$P(OH)_{x(1-4)}$—COO—$R_2$, wherein $R_1$ and $R_2$ is an alkyl or allyl residue having 1 to 10 C atoms, P is a phenyl ring, OH is a hydroxyl group bonded to the phenyl ring, and x is a number of hydroxyl groups bonded to the phenyl ring.

19. The method according to claim 18, wherein the applying the luminescent pigment on the PVB film comprises spraying, screen printing, offset printing, ink jet printing, and/or flexographic printing.

* * * * *

UNITED STATES PATENT AND TRADEMARK OFFICE
CERTIFICATE OF CORRECTION

PATENT NO. : 8,722,195 B2  
APPLICATION NO. : 13/499235  
DATED : May 13, 2014  
INVENTOR(S) : Michael Labrot Page 1 of 1

It is certified that error appears in the above-identified patent and that said Letters Patent is hereby corrected as shown below:

On the Title Page

Item (75) (Inventors), please delete "Gonazález" and replace it with "González"

Signed and Sealed this  
Fifth Day of August, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,722,195 B2  
APPLICATION NO. : 13/499235  
DATED : May 13, 2014  
INVENTOR(S) : Labrot et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 58 days.

Signed and Sealed this

Twenty-ninth Day of September, 2015

Michelle K. Lee
*Director of the United States Patent and Trademark Office*